(12) United States Patent

Harms et al.

(10) Patent No.: US 9,604,732 B2
(45) Date of Patent: Mar. 28, 2017

(54) METHOD FOR CONTROLLING AN OBSTRUCTION LIGHT

(75) Inventors: Stephan Harms, Aurich (DE); Gerd Moller, Bremen (DE); Werner Schweizer, Klixbull (DE)

(73) Assignee: Aloys Wobben, Aurich (DE)

( * ) Notice: Subject to any disclaimer, the term of this patent is extended or adjusted under 35 U.S.C. 154(b) by 1160 days.

(21) Appl. No.: 13/321,524

(22) PCT Filed: May 17, 2010

(86) PCT No.: PCT/EP2010/056724
§ 371 (c)(1),
(2), (4) Date: Mar. 2, 2012

(87) PCT Pub. No.: WO2010/133541
PCT Pub. Date: Nov. 25, 2010

(65) Prior Publication Data
US 2012/0146783 A1 Jun. 14, 2012

(30) Foreign Application Priority Data
May 20, 2009 (DE) .................. 10 2009 026 407

(51) Int. Cl.
| G08B 1/08 | (2006.01) |
| B64F 1/20 | (2006.01) |
| F03D 80/10 | (2016.01) |
| H01Q 1/42 | (2006.01) |
| H01Q 1/06 | (2006.01) |
| G01S 13/87 | (2006.01) |
| H01Q 21/06 | (2006.01) |
| G01S 7/00 | (2006.01) |

(52) U.S. Cl.
CPC ................ *B64F 1/20* (2013.01); *F03D 80/10* (2016.05); *G01S 7/003* (2013.01); *G01S 13/87* (2013.01); *H01Q 1/06* (2013.01); *H01Q 1/42* (2013.01); *H01Q 21/065* (2013.01); *Y02B 10/30* (2013.01); *Y02E 10/722* (2013.01); *Y02E 10/728* (2013.01)

(58) Field of Classification Search
CPC ...... F03D 11/0041; F03D 7/048; G01S 7/003; G01S 13/91
USPC ...................................... 340/539.1, 539, 500
See application file for complete search history.

(56) References Cited

U.S. PATENT DOCUMENTS 5,153,836 A * 10/1992 Fraughton ................ G08G 9/02
340/961
5,282,337 A * 2/1994 Duhame ............... E05F 15/668
160/188

(Continued)

FOREIGN PATENT DOCUMENTS

DE 20 2004 006 595 U1 8/2004
DE 20 2005 019 193 U1 3/2006
(Continued)

*Primary Examiner* — Firmin Backer
*Assistant Examiner* — Adnan Aziz
(74) *Attorney, Agent, or Firm* — Seed Intellectual Property Law Group LLP

(57) ABSTRACT

The invention concerns a method of controlling a flight obstacle lighting arrangement, wherein a receiver co-operates with a switching device for the flight obstacle lighting arrangement. According to the invention it is proposed that the receiver upon receiving a first predetermined signal controls the switching device in such a way that the flight obstacle lighting arrangement is switched off.

14 Claims, 2 Drawing Sheets

(56) References Cited

U.S. PATENT DOCUMENTS

| | | | | |
|---|---|---|---|---|
| 5,357,169 A * | 10/1994 | Toyozumi | B60Q 3/0293 | 307/10.8 |
| 5,451,930 A * | 9/1995 | McDaniel | F25D 29/008 | 340/521 |
| 5,831,570 A * | 11/1998 | Ammar | F41G 7/2226 | 342/149 |
| 6,097,290 A * | 8/2000 | Balfour | H05B 37/0209 | 315/84 |
| 6,810,310 B1 | 10/2004 | McBain | B64D 45/0015 | 244/118.5 |
| 7,136,011 B2 * | 11/2006 | Mork | G01S 7/003 | 340/945 |
| 7,183,946 B2 * | 2/2007 | Boudrieau | B64D 45/0015 | 244/189 |
| 7,499,773 B2 * | 3/2009 | Pire et al. | | 701/3 |
| 7,876,260 B2 * | 1/2011 | Laufer | | 342/61 |
| 7,899,621 B2 * | 3/2011 | Breed | B60N 2/2863 | 340/995.1 |
| 2004/0252046 A1 * | 12/2004 | Mork et al. | | 342/29 |
| 2005/0079052 A1 * | 4/2005 | Wobben | | 416/5 |
| 2006/0132323 A1 * | 6/2006 | Grady, Jr. | | 340/815.45 |
| 2008/0055149 A1 * | 3/2008 | Rees | H01Q 1/28 | 342/29 |
| 2009/0034259 A1 * | 2/2009 | Laufer | | 362/253 |
| 2009/0171506 A1 * | 7/2009 | Donaldson | G05D 23/1902 | 700/277 |
| 2010/0085241 A1 * | 4/2010 | Meyers | G01S 7/411 | 342/129 |
| 2010/0194603 A1 * | 8/2010 | Wobben | | 340/983 |
| 2010/0309024 A1 * | 12/2010 | Mimeault | | 340/932.2 |
| 2011/0241926 A1 * | 10/2011 | Laufer | | 342/61 |
| 2011/0291853 A1 * | 12/2011 | Riesberg et al. | | 340/686.6 |
| 2012/0146783 A1 * | 6/2012 | Harms et al. | | 340/539.1 |
| 2013/0202446 A1 * | 8/2013 | Siegfriedsen | | 416/244 A |
| 2013/0278445 A1 * | 10/2013 | Quell et al. | | 340/983 |
| 2014/0252775 A1 * | 9/2014 | Hillerbrandt et al. | | 290/55 |
| 2014/0300497 A1 * | 10/2014 | Harms et al. | | 340/981 |

FOREIGN PATENT DOCUMENTS

| | | |
|---|---|---|
| DE | 10 2006 007 536 A1 | 8/2007 |
| JP | 2002-75670 A | 3/2002 |
| JP | 2002-260403 A | 6/2002 |
| JP | 2002-359693 A | 12/2002 |
| WO | 2006/092137 A1 | 9/2006 |
| WO | 2007/093570 A1 | 8/2007 |

* cited by examiner

METHOD FOR CONTROLLING AN OBSTRUCTION LIGHT

CROSS-REFERENCE TO RELATED APPLICATION

This application is a U.S. national stage application filed under 35 U.S.C. §371 of International Patent Application No. PCT/EP2010/056724, accorded an international filing date of May 17, 2010, which application is incorporated herein by reference in its entirety.

BACKGROUND

Technical Field

The present invention concerns a method of controlling a flight obstacle lighting arrangement and a structure having a flight obstacle lighting arrangement, in which a receiver co-operates with a switching device for the flight obstacle lighting arrangement. The invention further concerns a system for controlling a flight obstacle lighting arrangement.

Description of the Related Art

DE 20 2005 019 193 U1 discloses a system for controlling obstacle lighting arrangements by mode S transponder signals.

DE 10 2006 007 536 A1 discloses a wind power installation having a flight lighting arrangement in which the flight lighting arrangement is switched on only when a vehicle, preferably an aircraft, approaches the wind power installation to a predetermined distance.

It is also known in the field of flight obstacle identification in particular to provide lights for the lighting arrangement redundantly so that, even upon the failure of a light, the flight obstacle is always still identified as a flight obstacle and is correspondingly perceptible.

Flight obstacle lighting arrangements serve for flight safety to draw the attention of the pilots of aircraft to flight obstacles in good time. Accordingly in particular the safety aspect also plays a paramount part in operation of flight obstacle lighting arrangements.

BRIEF SUMMARY

The object of the present invention is to further improve the operational safety of flight obstacle lighting arrangements.

DETAILED DESCRIPTION

Figure 1:
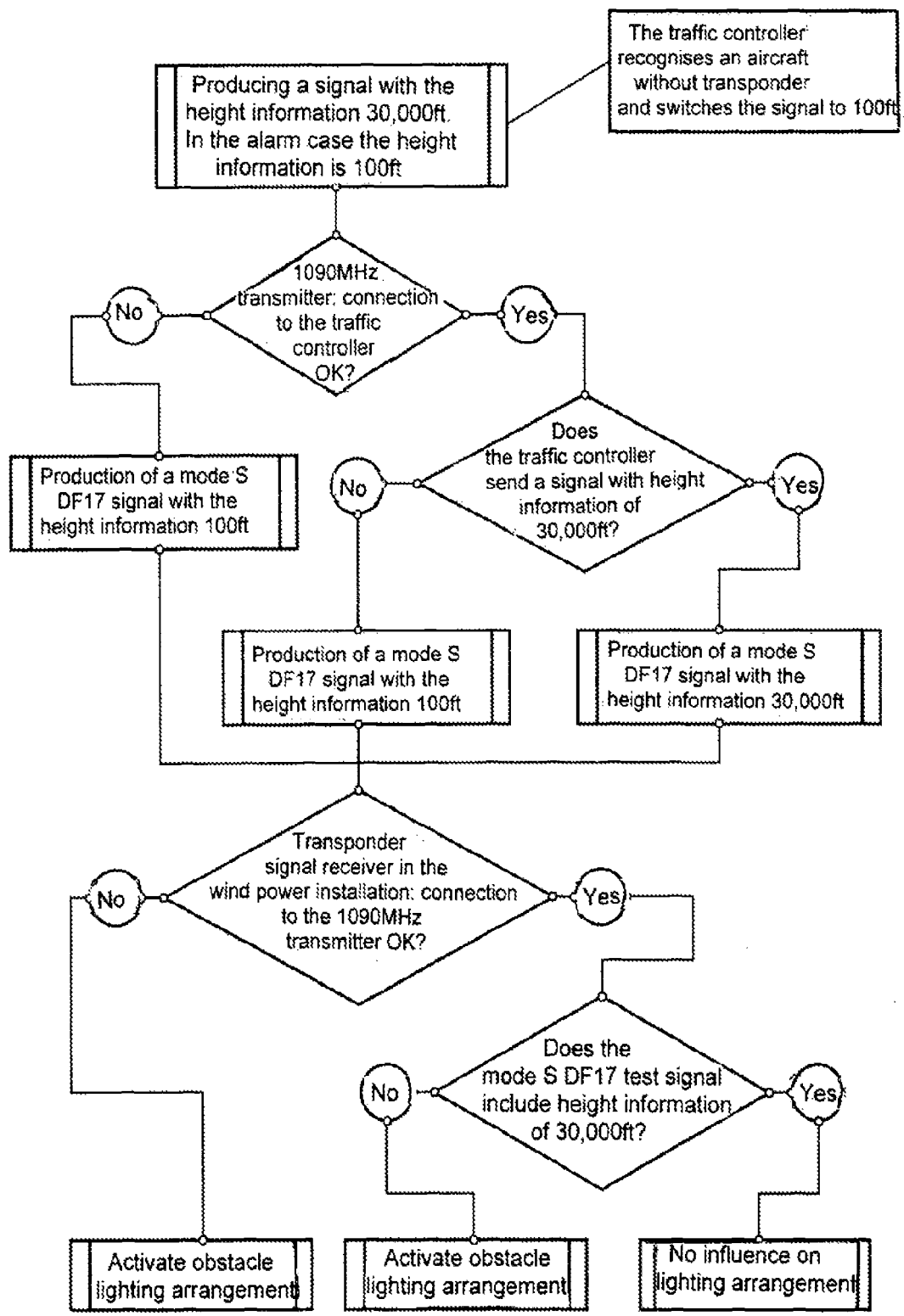
FIG. 1 is an illustrative flight obstacle lighting method.

For that purpose the method set forth in the opening part of this specification of controlling a flight obstacle lighting arrangement is so developed that the receiver upon receiving a first predetermined signal controls the switching device in such a way that the flight obstacle lighting arrangement is switched off. As long as the receiver therefore receives the first predetermined signal (and satisfactorily recognizes it and evaluates it) the assumption is justified that all components are operating correctly and any control signals can be detected and evaluated by the receiver.

In that respect the present invention is based on the realization that even redundantly implemented lights cannot compensate for every kind of malfunction but that continuous monitoring and an automatic reaction to faults in the control of the flight obstacle lighting arrangement with switching-on of the flight obstacle lighting arrangement can at any event reliably avoid the entirely unwanted situation where a flight obstacle lighting arrangement should actually be switched on, but this is not the case because of an undetected fault.

In a preferred development the method is characterized in that the flight obstacle lighting arrangement is switched on in the event of a disturbance in respect of the first predetermined signal. If therefore the first predetermined signal is no longer emitted or if the receiver no longer properly receives that signal (and likewise correctly recognizes and evaluates it), then that is a fault situation and therefore the flight obstacle lighting arrangement is switched on by the switching device solely to ensure flight safety even in the event of a fault.

Particularly preferably the method is characterized in that the flight obstacle lighting arrangement is switched on upon reception of a second predetermined signal. In that way it is possible at the receiver end to distinguish the flight obstacle lighting arrangement being deliberately switched on by a corresponding control signal, from the lighting arrangement being switched on as a precautionary measure because of a fault and corresponding messages can be displayed by way of suitable communication channels.

To permit effective control of the flight obstacle lighting arrangement of all structures in a large area such as for example a state, a province or the like the method according to the invention is characterized in that a central control station can communicate predetermined signals to a plurality of transmitting stations by way of intermediate stations, which signals cause the transmitting stations to emit predetermined signals. In that way the flight obstacle lighting arrangements can be controlled from a central control station by such a network topology.

In that respect it may be desirable that the flight obstacle lighting arrangements can be deliberately switched on in a given region or along a given route, for example if an aircraft cannot itself cause the flight obstacle lighting arrangements to be switched on, on its route, by a transponder, either because the transponder is not present or because it has failed. As soon as that has become known to the central control station the latter can switch on the flight obstacle lighting arrangements for example in the region in which the aircraft is on its way or along the route along which the aircraft is flying, if the plurality of transmitting stations includes all existing transmitting stations or transmitting stations which can be selected in accordance with predeterminable criteria.

In order also to be able to monitor correct functioning of the central control station and in order also not at any event to endanger flight safety even in the event of a fault on the part of the central control station, in accordance with a preferred development of the invention a fault in respect of the signal of the central control station causes the intermediate stations to transmit a signal to the transmitting stations, which causes shutdown of the transmitting stations or emission of the second predetermined signal.

Correct functioning of the intermediate stations can in turn be advantageously monitored by the transmitting stations associated with an intermediate station being shut down upon a fault in respect of the signal from that intermediate station, or emitting the second predetermined signal.

To improve flight safety the structure of the kind set forth in the opening part of this specification is characterized by actuation of the switching device in such a way that the switching device switches off the flight obstacle lighting arrangement upon reception of a first predetermined signal by the receiver.

That function can ensure that the flight obstacle lighting arrangement is switched off only when it can also be switched on by a corresponding signal. Or, to put this another way, when the devices required for that purpose, the receivers and switching device, are operating satisfactorily.

In a preferred development the structure is characterized by actuation of the switching device in such a way that upon a fault in respect of the first predetermined signal the switching device switches on the flight obstacle lighting arrangement. It is thus possible, depending on the nature of the fault and the cause thereof, to ensure that at any event the flight obstacle lighting arrangement is switched on as a precaution if a malfunction can have occurred. Or, in other words, the flight obstacle lighting arrangement is in no case switched off if it cannot be reliably switched off.

To be able to switch on the flight obstacle lighting arrangements specifically in a given region or along a given route a development of the structure provides for actuation of the switching device in such a way that the switching device switches on the flight obstacle lighting arrangement upon reception of a second predetermined signal by the receiver.

In a particularly preferred embodiment of the invention the structure is characterized by being in the form of a wind power installation.

According to the invention the system referred to in the opening part of this specification for the control of a flight obstacle lighting arrangement is characterized by a central control station, a plurality of intermediate stations and a plurality of transmitting devices, wherein the transmitting devices are connected to the central control station by means of the intermediate stations and wherein the central control station constantly emits a control station signal which is received by the intermediate stations and wherein the intermediate stations constantly emit a first predetermined signal as long as they receive the control station signal.

The solution according to the invention defines a backup system for the intrastructure of the flight obstacle lighting arrangement.

More specifically, a lack of signal delivery on the part of an aircraft has the result that that aircraft does not activate the obstacle lighting arrangement if activation of the obstacle lighting arrangement presupposes the reception of a given signal delivery on the part of the aircraft.

A reliable backup solution for a transponder from an aircraft is a redundant transponder. The present application however does not describe transponder redundancy in the aircraft but a backup system which is different therefrom.

Thus it is to be assumed for example that all aircraft in a given air space are also subject to flight monitoring (for example by means of radar) and are detected thereby and when then flight monitoring—there for example the air traffic controllers—recognize that a transponder has failed in an aircraft or that aircraft does not have any transponder at all, flight monitoring usually initiates measures which lead to the obstacle lighting arrangement being activated, if necessary.

It is therefore in accordance with the invention to install in the range of wind power installations a device which sends a mode S transponder signal (test signal, for example DF17) for example at 1090 MHz. Those transmitters can also be installed for example on wind power installations themselves. Besides an identifiable recognition and a position input—for example North Pole co-ordinates—that signal includes height information and is emitted in the order of magnitude of about once per second at a fixed interval.

The signal can also include positional information such as for example 'North Pole' without any height information.

A receiver is capable of receiving and evaluating that signal so that the receiver for example can establish where the signal is coming from and what height information or location information the signal includes.

In accordance with the invention the described transmitter can now for example always emit a transponder signal which includes height information of 30,000 ft.

When such a signal is received and evaluated by the receiver the height of 30,000 ft is classified as not relevant and according to the invention does not lead to activation of the lighting arrangement but rather the lighting arrangement remains switched off. Transmission of the signal with the height information of for example 30,000 ft is also emitted when no measures in respect of a transponder failure are initiated by the flight control/air traffic controllers and permanent testing of the connection between the device and the air traffic controllers turns out to be positive.

The transponder signal receiver in the wind power installation/wind park now tests the prescribed input, for example every second, of the test signal, that is to say the DF17 signal with the height information of 30,000 ft. When the signal is received and the height information of 30,000 ft can be correctly evaluated, the obstacle lighting arrangement remains shut down. The obstacle lighting arrangement is activated however if the signal fails, in which respect signal failure can mean not only that the signal as such physically entirely fails, but failure can also mean that the signal is so disturbed that the height information of 30,000 ft and/or the predetermined positional information can no longer be evaluated.

In the case of a transponder failure of an aircraft, which is recognized by the flight control station or air traffic controllers, the flight control station/air traffic controller therefore activates a further signal and thereby activates a transmitter or a defined number of transmitters (for example according to respective air and ground space) in order to switch on the lighting arrangement on wind power installations in limited areas or complete regions. The transponder test signal emitted by the one or many transmitters then contains the height information 100 ft and because that height is classified as relevant upon reception that leads to activation of the lighting arrangement.

In principle there are then at least two alternatives:

In the first alternative, when the emission of a test signal with the height information for example of 100 ft is implemented, emission of the test signal with the height information of 30,000 ft is suppressed.

Another possibility is that it is permitted that, in addition to emission or reception of the height information 30,000 ft, the second signal is emitted or can also be received, that is to say the second signal with the height information of for example 100 ft. If now the transponder receiver of a wind power installation receives both signals, that leads to activation of the obstacle lighting arrangement of the wind power installation because, whenever the receiver of the wind power installation receives a test signal which includes height information which is markedly below 30,000 ft (or the predetermined positional information differs), the obstacle lighting arrangement is switched on, more specifically even when height information with the content of 30,000 ft is nonetheless received from another transmitter.

The obstacle lighting arrangement is therefore only switched off when no other test signal is received, which includes height information, for example of 30,000 ft, which reliably excludes a collision between an aircraft and a wind power installation.

If now the test signal with the height information 30,000 ft fails, that leads to (immediate) switching-on of the obstacle lighting arrangement.

The obstacle lighting arrangement of the wind power installation is also switched on when there is not an adequate connection between the test signal transmitter (which transmits the test signal with the height information 30,000 ft) and the flight control station/air traffic controller or if there is not an adequate connection between the transponder signal receiver in the wind power installation and the test signal transmitter or—as already mentioned—the transponder signal receiver in the wind power installation receives a signal having height information which is markedly below 30,000 ft, for example 100 ft.

If there are objections to use of the 1090 MHz frequency signal the aforementioned test signals can also be communicated directly by means of UMTS/GPRS or alternatively by way of the Internet or other transmission methods to the receivers of the wind power installation.

The backup system according to the invention for the failure of a transponder in the aircraft is illustrated in FIG. 1.

The height information referred to there of 30,000 ft correspondingly stands for all those items of height information at which a collision between the aircraft and a wind power installation can be certainly ruled out.

Height information of 100 ft in contrast stands correspondingly for height information at which a collision between a wind power installation and an aircraft cannot be ruled out.

As in the meantime wind power installations are also of heights which are 200 m and higher so that therefore even upon the reception of a signal including height information of 250 m, the obstacle lighting arrangement is activated, but activation of an obstacle lighting arrangement does not occur when a signal is received, which contains height information of more than 1000 to 2000 m.

Figure 2:
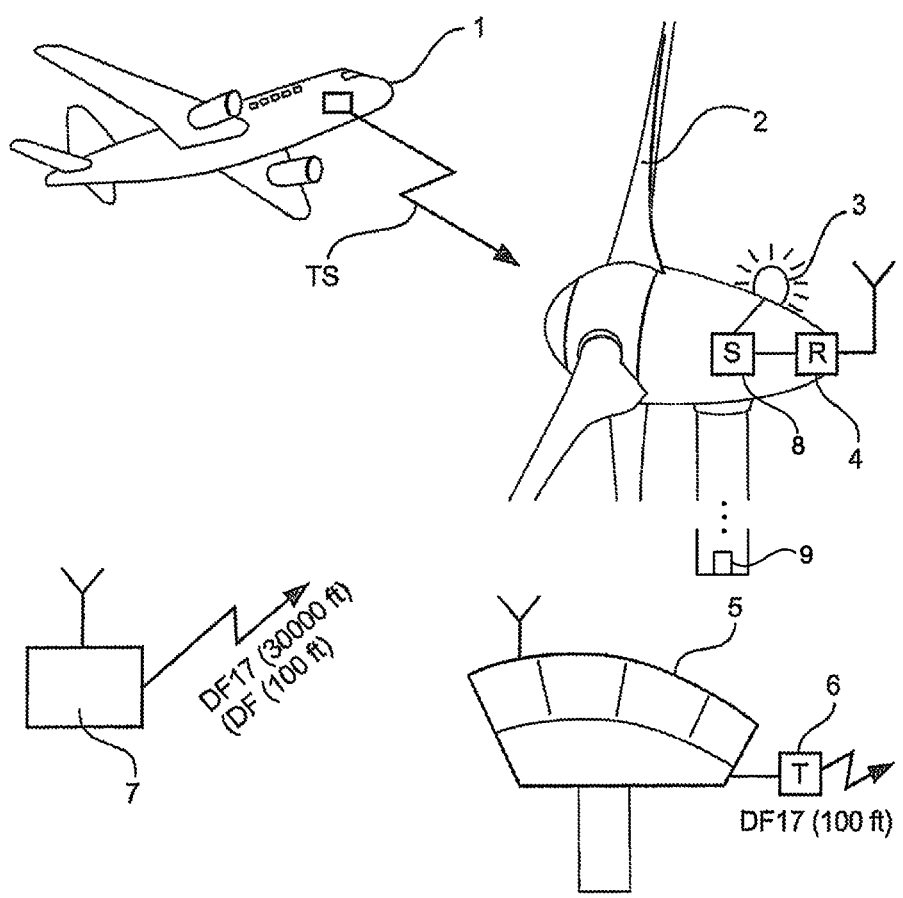
FIG. 2 is an illustrative flight obstacle lighting system including an aircraft transponder system and a flight obstacle lighting system including a receiver and switch.

FIG. 2 shows once again a view of an embodiment of the invention.

When an aircraft 1 approaches a wind power installation 2 and in that case the flying height of the aircraft is below a predetermined height an obstacle lighting arrangement 3 of the wind power installation 2 must be switched on if that is specified in accordance with the regulations.

Switching-on of the obstacle lighting arrangement 3 can be triggered by a transponder signal TS from the aircraft when that signal is received by a receiver 4 of the wind power installation and evaluated and in that case it is possible in particular to detect height information which results in activation of the obstacle lighting arrangement.

If the aircraft is not capable of emitting the desired transponder signal TS—for whatever reasons—that means that activation of the obstacle lighting arrangement is not possible in that respect because the receiver 4 of the wind power installation does not receive a corresponding activation signal.

If now a flight control station 5 finds that an aircraft 1 is present in the air space—for that purpose the flight control stations regularly employ radar or other monitoring equipment—and the aircraft is not emitting a transponder signal TS, but nonetheless the aircraft is below a given height, the flight control station 5 can send a suitable signal, for example DF17-100 ft by way of a transmitting device 6, then it will be self-evident that the obstacle lighting arrangement 3 of the wind power installation 2 is activated when that signal is received by the receiver 4 of the wind power installation 2.

That signal DF17-100 ft from flight monitoring 5 can however also be emitted by a further receiving/transmitting station 7 if the emission was caused by the flight monitoring system 5. That solution is to be preferred in particular when flight monitoring 5 is arranged outside the radio range relative to the wind power installation but the receiving/transmitting station 7 is arranged in the radio range relative to the wind power installation.

That receiving/transmitting station is of such a design that it emits a signal DF17-30,000 ft recurrently, for example once per second. When that signal—and only that signal—is received by the receiver 4 of the wind power installation 2, the obstacle lighting arrangement remains switched off.

If now the receiving/transmitting station has failed or is damaged in any way, or at any event is no longer capable of emitting the signal DF17-30,000 ft, that is registered by the receiver 4 or the downstream-connected evaluation device (not shown) of the wind power installation 2 and automatically leads to activation of the obstacle lighting arrangement 3.

The obstacle lighting arrangement 3 of the wind power installation 2 is also activated if a further signal, for example DF17-100 ft, is received in addition to the DF17-30,000 ft signal.

If now it should be established by the flight control station that their own transmitting device 6—for whatever reasons—is damaged, defective, has failed or the like it is possible, when the flight control station 5 is connected to the transmitting station 7 in some other fashion electrically or by telecommunication technology, for the entire telecommunication station 7 to be switched off so that the obstacle lighting arrangement 3 is also automatically activated by the absence of the signal DF17-30,000 ft.

As mentioned the wind power installation has a receiving device with a downstream-connected evaluation and switching device 8 so that, when the target signal to be received, for example DF17-30,000 ft, fails to appear, that is detected in the evaluation device and that leads to activation of a switching signal which then activates the obstacle lighting arrangement. That activation also takes place when the above-mentioned target signal DF17-30,000 ft is correctly received, but the evaluation device is defective so that at the output of the evaluation device (that can be an electrical circuit) there is a signal which is no longer interpreted as an obstacle lighting arrangement switch-off signal by the switching device 8, but as an obstacle lighting arrangement switch-on signal.

As mentioned the flight control station can also be able to generate a corresponding DF17-signal which is then sent to the receiving/transmitting station 7 in order from there to be further sent to the wind power installation or the receiver thereof.

The monitoring structure which is set up between that receiving/transmitting station 7 and the wind power installation 2, that is to say activation of the obstacle lighting arrangement when the DF17-30,000 ft signal fails to appear, can also be set up between the flight control station 5 and the receiving/transmitting station 7, more specifically in such a way that, when the receiving/transmitting station 7 does not receive any signal from the flight control station 5 within a given period, for example 1 second or 10 seconds or the like, the emission of the DF17-30,000 ft-signal is automatically suppressed and/or the emission of a DF17-100 ft-signal is activated. If therefore the transmitting device in the flight control station is defective or the like then, as mentioned, that automatically also leads to activation of the obstacle lighting arrangements which co-operate with the receiving/transmitting station 7 in the described manner.

A preferred supplement to the foregoing solution according to the invention but also at the same time an independent variant according to the invention provides that the obstacle lighting arrangement (daylight lighting white or night time lighting red) is always activated—that is to say also independently of the reception of any DF17-signal—when people enter the wind power installation, either visitors or service personnel. That activation can also be triggered by a door 9 of the wind power installation, by way of which access to the wind power installation can be afforded, being connected to a switch which activates the obstacle lighting arrangement when the door 9 is opened and de-activates the obstacle lighting arrangement when the door 9 is closed or a predetermined period thereafter, unless the above-described case of activation of the wind power installation prevails, for example absence of the DF17-30,000 ft signal.

The above-described variant which is also to be used independently has the advantage that the people who are in the wind power installation can stay there even more safely than hitherto. It is also thus possible to see from afar, at which wind power installation service operations are being implemented.

Insofar as a DF17 signal with a particular item of height information, for example 30,000 feet, is described in the present application, which upon reception by the transponder signal receiver of a wind power installation of a wind park provides that the obstacle lighting arrangement is switched off, it should be made clear that such a switch-off signal is also effected when, instead of an item of height information for example of 30,000 feet, an item of location information, for example 'North Pole' or 'South Pole' is inputted and that is received by the transponder signal receiver and evaluated. In the case of such an item of location information, for example 'North Pole' or 'South Pole' the receiver knows that this is a location which is very far away and thus there is no risk of collision. Instead of such an item of information which is at maximum distance away such as North Pole or South Pole it will be appreciated that it is also possible to input other items of location information, in respect of which it is certain that no collision is to be feared.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of controlling a flight obstacle lighting arrangement of a wind power installation, the method comprising:
   using a transponder signal receiver, receiving a first predetermined data signal that includes a height of an aircraft in a vicinity of the wind power installation;
   comparing the height of the aircraft to a threshold value; and
   when the height of the aircraft is determined to be above the threshold value, using a switching device coupled to the flight obstacle lighting arrangement to switch off the flight obstacle lighting arrangement.

2. The method according to claim 1, further comprising:
   switching on the flight obstacle lighting arrangement when at least one of the following occurs:
   a fault;
   the first predetermined data signal is not received; and
   an incorrect evaluation of the first predetermined data signal.

3. The method according to claim 1, further comprising switching on the flight obstacle lighting arrangement upon receipt of a second predetermined signal.

4. The method according to claim 3, wherein a central control station transmits at least one of the first predetermined data signal and the second predetermined signal through at least one intermediate station to a plurality of transmitting stations.

5. The method according to claim 4 wherein the plurality of transmitting stations includes either all existing transmitting stations, or transmitting stations selected in accordance with at least one predetermined criterion.

6. The method according to claim 4 wherein a fault in the first predetermined data signal or the second predetermined signal of the central control station causes the at least one intermediate station to transmit a signal to at least a portion of the plurality of transmitting stations, causing the transmitting stations to either switch off, or emit the second predetermined signal.

7. The method according to claim 4 wherein, in the event of a fault in the signal of an intermediate station, the transmitting stations associated with said intermediate station emit the second predetermined signal.

8. The method according to claim 1, wherein when the height of the aircraft is determined to be less than the threshold value, switching on the flight obstacle lighting arrangement.

9. The method according to claim 1 further comprising:
   receiving a plurality of the first predetermined data signals at intervals; and
   so long as the using first predetermined data signals are received at the intervals, maintaining the flight obstacle lighting arrangement off.

10. A wind power installation comprising:
    a flight obstacle lighting arrangement;
    a transponder signal receiver configured to receive a plurality of first transponder signals at intervals, the first transponder signals including a height value, the transponder signal receiver being configured to compare the received first transponder signals to a threshold value; and
    a switching device coupled to the receiver and to the flight obstacle lighting arrangement, the switching device configured to switch off the flight obstacle lighting arrangement in response to the transponder signal receiver receiving one of the first transponder signals that is at or above the threshold value, wherein the flight obstacle lighting arrangement remains off while the receiver receives the plurality of first transponder signals that are at or above the threshold value and received at the intervals, the switching device further configured to switch on the flight obstacle lighting arrangement in response to the transponder signal receiver receiving one of the first transponder signals that is below the threshold value.

11. The wind power installation according to claim 10 wherein, the switching device is structured to switch on the flight obstacle lighting arrangement in response to detection of a fault in the first transponder signal.

12. The wind power installation according to claim 10 wherein the flight obstacle lighting arrangement comprises a wind power installation.

13. The wind power installation according to claim 10, further comprising at least one entrance door operatively connected to the switching device, wherein the switching device is structured to activate the flight obstacle lighting arrangement in response to the at least one entrance door being opened.

14. The wind power installation according to claim 10 wherein the plurality of first transponder signals are data signals.

* * * * *